United States Patent
Suk et al.

(10) Patent No.: US 8,909,485 B2
(45) Date of Patent: Dec. 9, 2014

(54) METHOD OF MEASURING PUMPING AMOUNT OF GROUNDWATER BY USING WATER LEVEL FLUCTUATION AND WATER LEVEL MEASURING SENSOR

(75) Inventors: Hee-Jun Suk, Daejeon (KR); Kyung-Seok Ko, Daejeon (KR)

(73) Assignee: Korea Institute of Geoscience and Mineral Resource (KIGAM), Daejeon (KR)

( * ) Notice: Subject to any disclaimer, the term of this patent is extended or adjusted under 35 U.S.C. 154(b) by 493 days.

(21) Appl. No.: 13/198,920

(22) Filed: Aug. 5, 2011

(65) Prior Publication Data
US 2012/0041692 A1 Feb. 16, 2012

(30) Foreign Application Priority Data
Aug. 10, 2010 (KR) ........................ 10-2010-0077000

(51) Int. Cl.
*G01F 1/00* (2006.01)
*E03B 3/06* (2006.01)
*G01F 13/00* (2006.01)

(52) U.S. Cl.
CPC . *E03B 3/06* (2013.01); *G01F 1/007* (2013.01); *G01F 13/006* (2013.01)

USPC .............................................. 702/45; 702/50

(58) Field of Classification Search
USPC .............. 702/45, 50; 417/321, 361; 166/54.1; 73/152.61, 862.543
See application file for complete search history.

(56) References Cited

U.S. PATENT DOCUMENTS 6,826,492 B2 * 11/2004 Newman .......................... 702/45
8,019,559 B1 * 9/2011 Stevens et al. ................... 702/45

* cited by examiner

*Primary Examiner* — Elias Desta
(74) *Attorney, Agent, or Firm* — Ladas & Parry LLP

(57) ABSTRACT

A method of measuring a pumping amount of groundwater by using water level fluctuation, a water level measuring sensor including an arithmetic operation unit for calculating a pumping amount by using the method, and a computer-readable recording medium having recorded thereon a program for executing the method are disclosed. The method includes: obtaining groundwater level data according to a measurement time by measuring fluctuation of a groundwater level for a predetermined period continually at time intervals; comparing groundwater level formed in a full pumping period including an initial stage a quasi-balance period, and a recovery period calculates a total time when pumping has been performed, by using a measurement time of the sorted data; and calculates a total pumping amount by using the total pumping time calculated.

16 Claims, 5 Drawing Sheets

FIG. 5

| PUMPING DATE | PUMPING TIME | WATER LEVEL (+EL. m) | INDICATE POINT IN TIME WHEN PUMPING HAS BEEN PERFORMED |
|---|---|---|---|
| 2008-07-16 | 15:00:00 | 1698.7 | 0 |
| 2008-07-16 | 16:00:00 | 1703.5 | 0 |
| 2008-07-16 | 17:00:00 | 1705.9 | 0 |
| 2008-07-16 | 18:00:00 | 1707.8 | 0 |
| 2008-07-16 | 19:00:00 | 1709 | 0 |
| 2008-07-16 | 20:00:00 | 1710 | 0 |
| 2008-07-16 | 21:00:00 | 1548.6 | 1 |
| 2008-07-16 | 22:00:00 | 1710.8 | 0 |
| 2008-07-16 | 23:00:00 | 1712.4 | 0 |
| 2008-07-17 | 0:00:00 | 1713.5 | 0 |
| 2008-07-17 | 1:00:00 | 1714.5 | 0 |
| 2008-07-17 | 2:00:00 | 1715.1 | 0 |
| 2008-07-17 | 3:00:00 | 1715.9 | 0 |
| 2008-07-17 | 4:00:00 | 1716.1 | 0 |
| 2008-07-17 | 5:00:00 | 1716.8 | 0 |
| 2008-07-17 | 6:00:00 | 1717.4 | 0 |
| 2008-07-17 | 7:00:00 | 1717.8 | 0 |
| 2008-07-17 | 8:00:00 | 1718 | 0 |
| 2008-07-17 | 9:00:00 | 1718.2 | 0 |
| 2008-07-17 | 10:00:00 | 1647.3 | 1 |
| 2008-07-17 | 11:00:00 | 1242 | 1 |
| 2008-07-17 | 12:00:00 | 1384.4 | 0 |
| 2008-07-17 | 13:00:00 | 1692.4 | 0 |
| 2008-07-17 | 14:00:00 | 1597.8 | 1 |
| 2008-07-17 | 15:00:00 | 1707.6 | 0 |
| 2008-07-17 | 16:00:00 | 1709.6 | 0 |
| 2008-07-17 | 17:00:00 | 1697.3 | 0 |
| 2008-07-17 | 18:00:00 | 1643.3 | 1 |
| 2008-07-17 | 19:00:00 | 1703.3 | 0 |
| 2008-07-17 | 20:00:00 | 1701.9 | 0 |
| 2008-07-17 | 21:00:00 | 1691.4 | 0 |
| 2008-07-17 | 22:00:00 | 1698.9 | 0 |

FIG. 6

| [1] | METHOD OF MEASURING PUMPING AMOUNT ACCORDING TO THE PRESENT INVENTION | | | [2] | METHOD OF CHECKING TYPICAL PATTERN BY NAKED EYE | | ERROR RATE (%) |
|---|---|---|---|---|---|---|---|
| Dmax (cm) | tol (cm) | TOTAL PUMPING DURATION TIME (hour) | TOTAL PUMPING AMOUNT | TOTAL PUMPING DURATION TIME (hour) | TOTAL PUMPING AMOUNT | | ([2] METHOD − [1 METHOD]) /[2] METHOD * 100 |
| 20 | 5 | 911 | 2846.9 | | | −8.1 |
| 30 | 5 | 842 | 2631.3 | | | 0.1 |
| 40 | 5 | 793 | 2478.1 | | | 5.9 |
| 20 | 10 | 924 | 2887.5 | | | −9.6 |
| 30 | 10 | 848 | 2650.0 | 843 | 2634.4 | −0.6 |
| 40 | 10 | 795 | 2484.4 | | | 5.7 |
| 20 | 15 | 958 | 2993.8 | | | −13.6 |
| 30 | 15 | 854 | 2668.8 | | | −1.3 |
| 40 | 15 | 799 | 2496.9 | | | 5.2 |

METHOD OF MEASURING PUMPING AMOUNT OF GROUNDWATER BY USING WATER LEVEL FLUCTUATION AND WATER LEVEL MEASURING SENSOR

CROSS-REFERENCE TO RELATED PATENT APPLICATION

This application claims the benefit of Korean Patent Application No. 10-2010-0077000, filed on Aug. 10, 2010, in the Korean Intellectual Property Office, the disclosure of which is incorporated herein in its entirety by reference.

BACKGROUND OF THE INVENTION

1. Field of the Invention

The present invention relates to measuring of the amount of groundwater pumped by using water for life, water for agriculture, etc., and more particularly, to a method of measuring a pumping amount of groundwater by using water level fluctuation.

2. Description of the Related Art

In water resources in Korea, there are many limitations in using surface water due to a rapid change of an industrial structure, an increase in the demand for water caused by population growth and a change of recognition of the ecological environment. Thus, the role of groundwater as alternative water resources has been increased.

At present, the amount of groundwater in Korea is about 3.7 billion $m^3$, 2.5 billion $m^3$ that corresponds to 67% of 3.7 billion $m^3$ has been developed and used in an agricultural area. Due to expansion of high-income controlled agriculture and abnormal climate, such as drought, or the like, it is deemed that the use of groundwater increases steadily.

However, systematic management of the development and use of groundwater has not been conducted, and thus groundwater environmental problems occur due to thoughtless development etc. For example, as water for agriculture for transfer is concentrically used in the agricultural area in May and June in Korea, small agricultural holes for using groundwater have been indiscreetly developed to obtain water, and due to excessive pumping works, the level of groundwater drops, and groundwater is exhausted.

In particular, in order to manage groundwater systematically, the amount of groundwater pumped by a pumping pump etc. needs to be precisely investigated. However, it is very difficult to calculate an actual pumping amount of groundwater and thus precise investigation has not been conducted.

In other words, in the related art, the pumping amount of groundwater is measured by calculating the amount at which the pumping pump has been used, by investigating the amount of electricity for agriculture, or the pumping amount of groundwater in the entire area is estimated from a pumping amount in a particular observation well. In particular, in a method of estimating the time when the pumping pump has been used, from the amount of electricity for agriculture, electricity is used in other many agricultural tools than the pumping pump and thus the reliability of the method is significantly lowered.

However, the amount of development of groundwater can be precisely calculated only if the pumping amount for a predetermined period, such as one month or one year, is precisely measured. Thus, a method of measuring a pumping amount of groundwater with reliability needs to be developed.

SUMMARY OF THE INVENTION

The present invention provides a method of measuring a pumping amount of groundwater by using water level fluctuation whereby the pumping amount of groundwater for a predetermined period can be measured with reliability by measuring a level of groundwater, a water level measuring sensor, a computer-readable recording medium having recorded thereon a program for executing the method.

According to an aspect of the present invention, a method of measuring a pumping amount of groundwater by using water level fluctuation whereby a total pumping amount of groundwater pumped by using a pumping pump is measured for a predetermined period, the method includes: obtaining groundwater level data according to a measurement time by measuring fluctuation of a groundwater level for a predetermined period continually at time intervals; comparing a typical pattern of a groundwater level formed in a full pumping period including an initial stage of pumping at which groundwater starts to be pumped by operating the pumping pump and the groundwater level drops rapidly, a quasi-balance period in which an amount of drop of the groundwater level according to time decreases compared to the initial stage of pumping, and a recovery period in which an operation of the pumping pump stops and the groundwater level rises, with the obtained groundwater level data and sorting data for forming a pattern corresponding to the typical pattern of the groundwater level from the groundwater level data; calculating a total time when pumping has been performed, by using a measurement time of the sorted data; and calculating a total pumping amount by using the total pumping time calculated.

The comparing of the typical pattern of the groundwater level with the obtained groundwater level data and the sorting of the data may include comparing two groundwater level data measured in the obtaining of the groundwater level data and determining whether a period between times when the two groundwater level data have been measured corresponds to which stage of an initial stage of pumping, a quasi-balance period, and a recovery period in the full pumping period.

The two groundwater level data to be compared with each other may be continually-measured data, and the groundwater level data may be measured at a predetermined time interval.

The comparing of the typical pattern of the groundwater level with the obtained groundwater level data and the sorting of the data may include calculating groundwater level differences between all of continued data measured in the obtaining of the groundwater level data and determining whether a period between times when all of continued data have been measured corresponds to which stage of an initial stage of pumping, a quasi-balance period, and a recovery period in the full pumping period, and the calculating of the total time may include adding times determined as the initial stage of pumping and the quasi-balance period to calculate a total time when pumping has been performed.

When two continued groundwater level data measured in the obtaining of the groundwater level data are compared with each other, if the groundwater level has dropped as time elapsed and an absolute value of the changed groundwater level difference exceeds a predetermined value Dmax, a period between times when the two groundwater level data have been measured may be determined to be included in the initial stage of pumping.

After it is determined that the initial stage of pumping has been performed based on preceding data among the groundwater level data measured in the obtaining of the groundwater level data, when two continued data that follow the preceding data are compared with each other and the groundwater level has dropped as time elapsed, a period between times when the two following groundwater level data have been measured may be determined to be included in the quasi-balance period.

After it is determined that the initial stage of pumping has been performed based on preceding data among the groundwater level data measured in the obtaining of the groundwater level data, when two continued data that follow the preceding data are compared with each other and an absolute value regarding a groundwater level difference changed as time elapsed is equal to or less than a predetermined value tol, a period between times when the two following groundwater level data have been measured may be determined to be included in the quasi-balance period.

After it is determined that the initial stage of pumping has been performed based on preceding data among the groundwater level data measured in the obtaining of the groundwater level data, when two continued data that follow the preceding data are compared with each other and the groundwater level exceeds a predetermined value tol and rises as time elapsed, a period between times when the two following groundwater level data have been measured may be determined to be included in the recovery period.

The obtaining of the groundwater level data may include measuring the groundwater level data at a predetermined time interval, and the comparing of the typical pattern of the groundwater level with the obtained groundwater level data and the sorting of the data may include calculating groundwater level differences between all of continued data measured in the obtaining of the groundwater level data and determining whether a period between times when all of continued data have been measured corresponds to which stage of an initial stage of pumping, a quasi-balance period, and a recovery period in the full pumping period, and the calculating of the total time may include calculating a number of periods (times) determined as the initial stage of pumping and the quasi-balance period and multiplying the calculated number by the predetermined time interval to calculate a total pumping time.

According to another aspect of the present invention, a water level measuring sensor disposed in the water and measuring a water level, includes an arithmetic operation unit for calculating a pumping amount of groundwater by using the method of measuring a pumping amount of groundwater by using water level fluctuation.

According to another aspect of the present invention, there is provided a computer-readable recording medium having recorded thereon a program for executing the method.

BRIEF DESCRIPTION OF THE DRAWINGS

The above and other features and advantages of the present invention will become more apparent by describing in detail exemplary embodiments thereof with reference to the attached drawings in which:

FIG. 5 is a table indicating a point in time when pumping has been performed, from the graph of FIG. 4; and FIG. 6 is a table indicating data regarding verification of reliability of a program for executing the method of FIG. 1.

DETAILED DESCRIPTION OF THE INVENTION

The present invention will now be described more fully with reference to the accompanying drawings, in which exemplary embodiments of the invention are shown.

Figure 1:
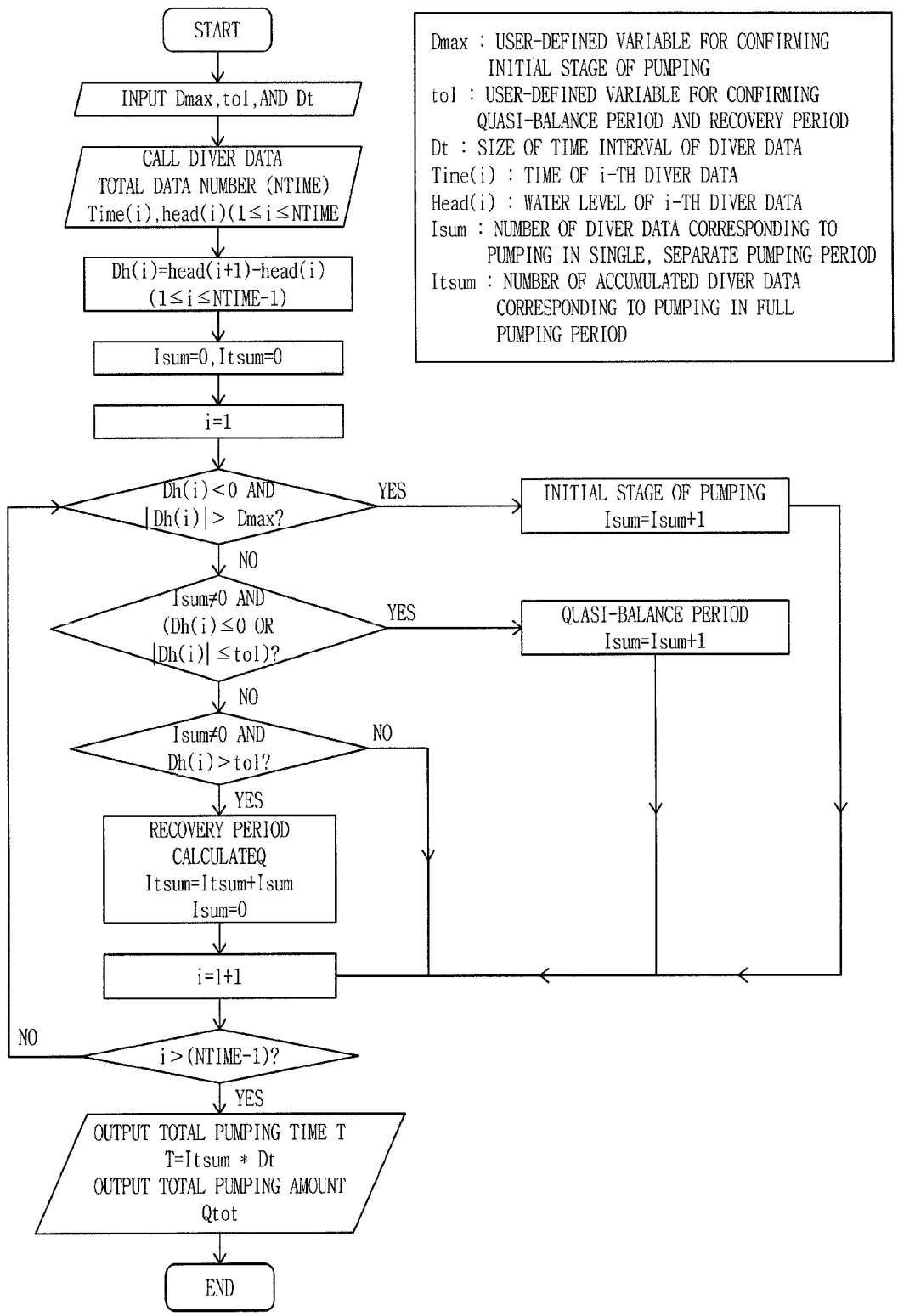
FIG. 1 is a schematic arithmetic logic flowchart illustrating a method of measuring a pumping amount of groundwater by using water level fluctuation, according to an embodiment of the present invention.
Figure 2:
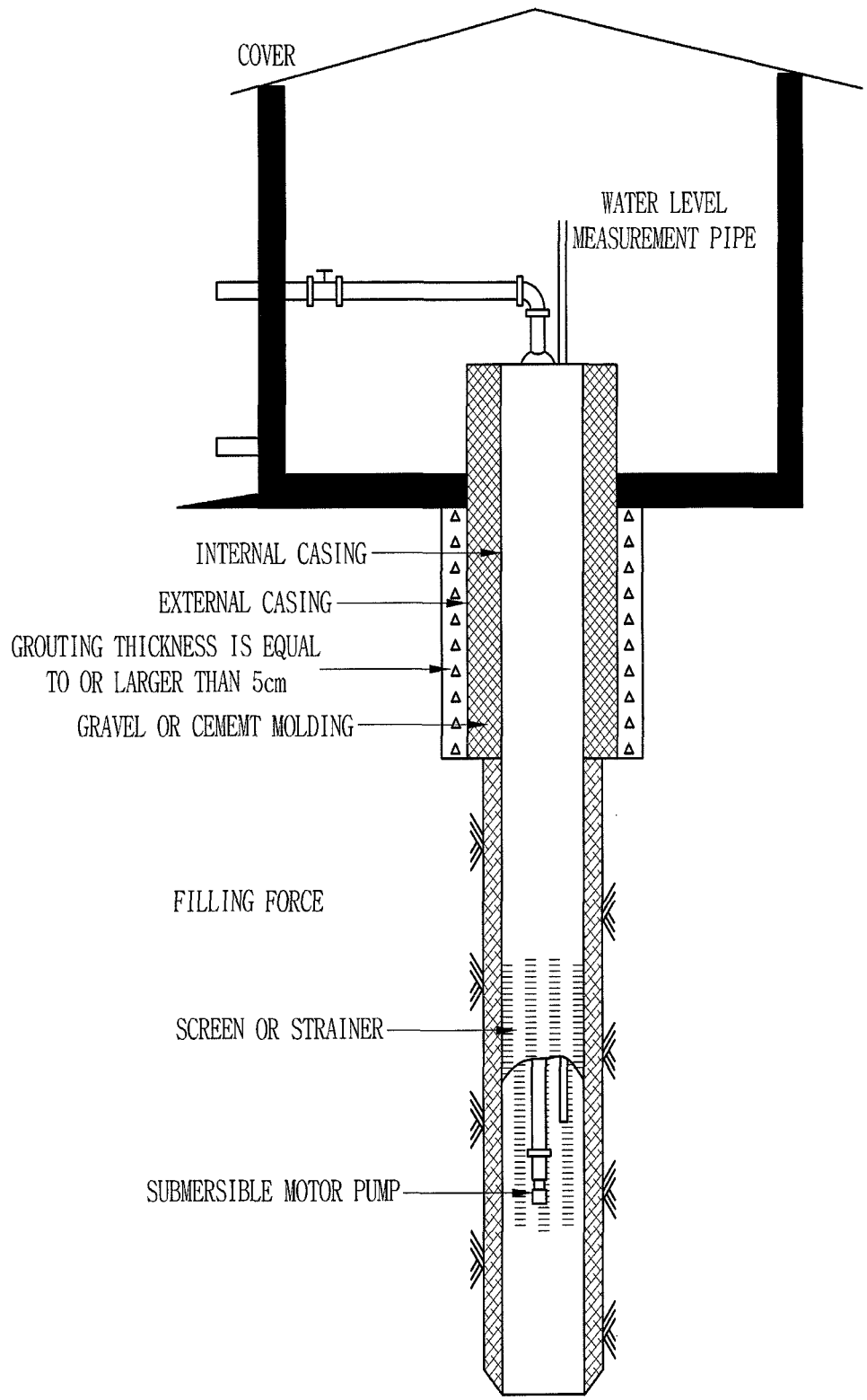
FIG. 2 illustrates a schematic configuration of an observation well for pumping of groundwater.
Figure 3:
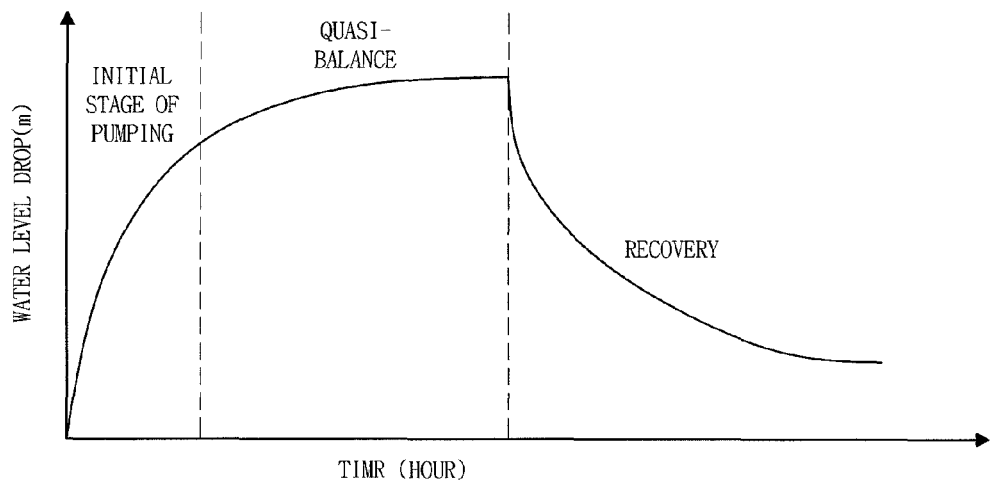
FIG. 3 is a graph showing a typical pattern of groundwater level fluctuation caused by pumping.

FIG. 1 is a schematic arithmetic logic flowchart illustrating a method of measuring a pumping amount of groundwater by using water level fluctuation, according to an embodiment of the present invention, and FIG. 2 illustrates a schematic configuration of an observation well for pumping of groundwater, and FIG. 3 is a graph showing a typical pattern of groundwater level fluctuation caused by pumping.

The present invention provides measuring of a pumping amount of groundwater, i.e., a method of calculating the amount of groundwater pumped for one year, for example. As illustrated in FIG. 2, the observation well is formed by drilling into the ground with a boring machine so as to pump groundwater. The depth of a drilled hole depends on the makeup of the soil but is formed to include an area in which an aquifer is formed. A pumping pump (submersible motor pump) is installed in the observation well, and groundwater pumped by the pumping pump is supplied to a storage tank for water for agriculture and a storage tank for water for life via pipes. The pumping pump is disposed in a lower place than an expectable lowest level of groundwater and is generally installed at a place of approximately 30 to 40 m.

According to the present invention, groundwater level fluctuation is used to measure the pumping amount of groundwater. In detail, when groundwater is pumped using the pumping pump, the level of groundwater forms a typical pattern as illustrated in FIG. 3.

Groundwater is pumped for a predetermined amount of time from the time when the pumping pump has operated, i.e., at an initial stage of pumping, and the level of groundwater drops rapidly. After the initial stage of pumping, a quasi-balance period in which the amount of groundwater pumped by the pumping pump and the amount at which peripheral groundwater is charged are balanced and minor groundwater level fluctuation occurs, lasts. After that, when the operation of the pumping pump stops, the level of groundwater rises rapidly and is recovered. In other words, the level of groundwater from the time when the pumping pump has operated to the time when the operation of the pumping pump stops, forms a typical pattern including an initial stage of pumping, a quasi-balance period, and a recovery period.

According to the present invention, the pumping amount of groundwater is measured using the typical pattern of groundwater level fluctuation when the pumping pump operates.

First, according to the present invention, the level of groundwater is continually measured for a predetermined period so as to measure the pumping amount of groundwater. The level of groundwater is measured by a water level measuring sensor. The water level measuring sensor is a well-known element, and there are various types of water level measuring sensors. In the present embodiment, a sensor that is soaked in the water and measures a water level, is used as the water level measuring sensor.

The water level measuring sensor is inserted in an observation well for pumping of groundwater for a measurement period and operates in such a way that the measured water level is transmitted to the outside in real time or a measured value of water level is stored in a data logger included in the water level measuring sensor. Time intervals for measurement of the level of groundwater are determined by a user and may vary according to circumstances.

When the water level of a measurement area is continually measured by the water level measuring sensor at predetermined time intervals, a plurality of water level data are obtained. For example, when the level of groundwater was measured for time intervals of one hour and was continually measured for one year, 8,760 (365×24) data regarding the level of groundwater are obtained.

According to the present invention, an arithmetic operation is performed on the pumping amount of groundwater from the data regarding the level of groundwater by using a computer program. Hereinafter, an arithmetic operation of the computer program will be described in detail.

Referring to FIG. 1, the user inputs predetermined values, i.e., Dmax, tol, and Dt, respectively, to the program by using an input unit, such as a keyboard. Here, Dmax represents a user-defined variable as a reference value for confirming an initial stage of pumping, and tol is a user-defined variable as a reference value for confirming a quasi-balance period and a recovery period during pumping, and Dt is a time interval at which the water level is measured by the water level measuring sensor. 'Diver' in the flowchart of FIG. 1 is a name of the water level measuring sensor.

After that, if groundwater level data obtained from the water level measuring sensor are called to a storage unit of the program, the number $N_{TIME}$ of the groundwater level data is counted, and a number i (where $1 \leq i \leq N_{TIME}$) is numbered from first-measured groundwater level data. In detail, when a groundwater level was measured 8,760 times in units of one hour for one year, groundwater level data was numbered from the first-measured groundwater level data to 1, 2, 3, . . . , 8758, 8759, and 8760 ($1 \leq i \leq 8760$).

A value of i-th data, i.e., a groundwater level is defined as head(i), and the time when the i-th data has been measured is defined as time (i). A difference between two groundwater level data, i.e., a groundwater level difference Dh(i) is defined as follows:

Groundwater level difference Dh(i)=head(i+1)−head(i), (where 11 $N_{TIME}$−1).

The groundwater level difference is a difference between two water level values that are continually measured. Here, continued data generally mean two continued data among data that are sequentially measured by the water level measuring sensor. However, only a part of all of data that are sequentially measured are extracted, and the extracted data are numbered in the order of the measurement time and thereby the continued data may be set as newly-numbered numbers.

For example, when the water level measuring sensor measures the water level 100 times and obtains first through $100^{th}$ data, continued data generally mean second data and third data, third data and fourth data, or $88^{th}$ data and $89^{th}$ data. However, when there is no need for comparing much data excessively, odd-numbered 50 data such as first, third, fifth data, and the like are extracted from 100 data and thereby fifth data and seventh data may be set as continued data. Similarly, when the water level is measured 100 times at a time interval of 1 minute and 100 minutes elapsed, totally 100 data are obtained. However, only 25 data among 100 data are extracted at a time interval of four minutes, and data are extracted in the order of fourth, eighth, twelfth, and the like and are re-numbered as i=1, 2, 3 in the order of measurement and thereby a water level difference between two continued data may be obtained.

In detail, although the data obtained from the water level measuring sensor may be numbered without any change and may be used as groundwater level data, only a part of data are extracted through processing, and the extracted data may be re-numbered, as described above.

In head(i) and time(i), i is from 1 to the number of measurement $N_{TIME}$, and in the groundwater level difference Dh(i), i is from 1 to $N_{TIME}$−1. When there are 100 groundwater level data, only 99 groundwater level differences occur.

In addition, initial values, i.e., Isum=0, Itsum=0, and Totalsum=0, are input to the program. Here, Isum represents the number of i when pumping has been performed between times when two continued data i and i+1 have been measured in a single pumping period, and Itsum represents an accumulation value of Isum values in the single pumping period of a full pumping period, and Q represents the sum of pumping amounts in the single pumping period, and Totalsum represents a full accumulation value of Q as the pumping amount in the full pumping period. The above values will be described later in detail.

After initial values, i.e., Isum=0, Itsum=0, and Totalsum=0, are input to the program, i=1 is input so that an arithmetic operation of the program for executing the method according to the present invention starts.

In detail, when i=1 is input, a first groundwater level difference Dh(1) is calculated by using the above-defined Equation as below.

Dh(1)=head(2)−head(1).

In the program, it is determined whether the calculated groundwater level difference corresponds to which stage of pumping. In the typical pumping pattern of FIG. 3, at an initial stage of pumping when pumping starts by operating the pumping pump, the groundwater level drops rapidly, and after the initial stage of pumping elapsed, a quasi-balance period in which minor fluctuation of the groundwater level according to time occurs, is maintained, and when the operation of the pumping pump stops, the groundwater level rises rapidly and reaches a recovery period.

In the program, it is determined whether a groundwater level difference that is a value between two continued data corresponds to which stage of pumping.

In other words, if two continued data are compared with each other, the groundwater level has dropped and the dropped amount (absolute value) exceeds a predetermined value Dmax, it may be determined that the current stage is an initial stage of pumping. If not a special case, the level of groundwater has rapidly dropped because groundwater starts to be pumped by the pumping pump. When the level of groundwater drops due to a natural phenomenon such as drought etc., such a rapid drop of groundwater level does not occur, and the level of groundwater drops gradually as time elapses.

Here, determination on the initial stage of pumping may vary by adjusting Dmax. In detail, if Dmax is set to a large value, only when the amount of drop of groundwater level is very large, it may be determined that the current stage is an initial stage of pumping, and if Dmax is set to a small value, even when the amount of drop of groundwater level is to some degree, it may be determined that the current stage is an initial stage of pumping. Dmax may be set empirically in consideration of various environmental factors, such as soil conditions, measurement time intervals, the capacity of a pumping pump, and the like.

In addition, when two continued data are compared with each other, there is minor fluctuation of the groundwater level and the level of groundwater hardly changes, i.e., when an absolute value regarding a groundwater level difference between the two continued data is equal to or less than a predetermined value tol, two cases may be regarded. One is a case where a period (time) between measured data is a quasi-balance period after the initial stage of pumping, and the other one is a case where pumping has not been performed.

In order to determine whether the current stage is which case of the two cases, data that precede the two continued data are referred to. In detail, if two data to be currently determined corresponds to the quasi-balance period, a data period determined as an initial stage of pumping among data that precede the current data is required to consider the typical groundwater level pattern during pumping, because the quasi-balance period cannot be introduced without the initial stage of pumping. If fluctuation of the groundwater level is minor without the initial stage of pumping, it may be determined that pumping has not been performed. Here, the predetermined value tol may also vary according to environmental factors, such as soil conditions, measurement time intervals, the capacity of a pumping pump, and the like and may be set by an empirical value.

In addition, even when two continued data are compared with each other and the level of groundwater exceeds the predetermined value tol and rises, two cases may be regarded. One is a case where the level of groundwater rises rapidly due to heavy rain etc., and the other one is a case where the operation of the pumping pump stops and the level of groundwater is rapidly recovered.

However, if there are data determined as the initial stage of pumping or the quasi-balance period among data measured prior to the two continued data to be currently determined, a groundwater level difference between the two current data may be recognized as the recovery period. In this regard, the width of rise of the groundwater level needs to exceed the predetermined value tol, because a case where the level of groundwater rises naturally due to the inflow of rainfall etc. is excluded. Tol may also be set to be the same as a value obtained by determining the quasi-balance period or may be set to be larger than the value obtained by determining the quasi-balance period considering that the groundwater level pattern in the recovery period changes more rapidly than in the quasi-balance period.

To sum up, if the level of groundwater that is a difference between two continued data is calculated, it is determined that a period between measurement times of the two continued data corresponds to which period among an initial stage of pumping, a quasi-balance period, and a recovery period based on the groundwater level difference. This determination is parallel; however, in a computer program, it is first determined whether the period between two data is the initial stage of pumping, and then it is determined whether the period between two data is the quasi-balance period and last, it is determined whether the period between two data is the recovery period. This order is not absolute and may be changed according to the computer program. In detail, it may be first determined whether the period between two data is the quasi-balance period and then, it may be determined whether the period between two data is the initial stage of pumping. Since any one of the above determinations is not a preceding condition, the determinations are performed in a parallel manner.

On the other hand, when, in the computer program, it is determined whether the period between two data is the quasi-balance period or the recovery period, it needs to be first determined whether there is any period determined as the initial stage of pumping or the quasi-balance period among periods between preceding data, as described above. If two continued data are determined as the initial stage of pumping or the quasi-balance period, in the program, Isum is obtained by adding 1 to Isum. In detail, if a period between two continued data is determined as an initial stage of pumping in the state where Isum=0 when the operation of the program starts, Isum=Isum+1, and Isum=1. If five, additional continued periods subsequent to the period between two continued data are continually determined as the initial stage of pumping, Isum will be continually accumulated and will be 6.

When fluctuation of the groundwater level difference between two continued data is minor in the state where Isum is 6 as described above, since Isum is 6 at the point in time, it is regarded that there was a period determined as the initial stage of pumping between data that precede data to be currently determined. Thus, it is determined that a period between two data to be currently determined is a quasi-balance period. If Isum is 0 at the current point in time of determination, it is determined that the current period is a period in which pumping has not been performed.

In addition, when 10 periods subsequent to the period determined as the quasi-balance period are determined as the quasi-balance period, Isum will increase to 16 due to the rule of Isum=Isum+1. After that, if two continued data are compared with each other, the groundwater level rises and the risen value exceeds the predetermined value tol, it is determined that a period between two continued data is determined as the recovery period, because Isum is not 0.

When pumping has been performed one time as described above, a typical pattern is formed and then, one cycle is completed, and Isum is accumulated according to the number of periods determined as the initial stage of pumping and the quasi-balance period. When two data are determined as the recovery period, pumping stops and thus, Itsum is derived therefrom. Itsum is an accumulated Isum value in a full pumping period and is derived based on the rule of Itsum=Itsum+Isum. When the operation of the program starts, Itsum is set as 0, as described above. Thus, in the above case, Itsum is 16 due to a value of Isum 16. If the value of Itsum is derived in this manner, the value of Isum is set as 0 again. In detail, since a single, separate pumping period has been terminated, the value of Isum is set as 0 and then, if pumping starts later, the value of Isum is newly accumulated.

If the value of Isum is not set as 0, an error occurs in calculation of the pumping amount. In detail, in a period before pumping starts after one-time pumping period is terminated, if there is no special reason due to heavy rain etc., the groundwater level difference between two continued data may be minor. In this regard, if Isum is not set as 0, in the computer program, it will be determined that a period between two continued data is a quasi-balance period. In spite that the period between two continued data needs to be determined as a period in which pumping has not been performed, Isum is not 0 and thus, it is determined that the period between two continued data is the quasi-balance period. Thus, if one-time pumping cycle is terminated (i.e., if there are data determined as the recovery period), Isum is reset as 0.

If pumping starts later, the initial stage of pumping or the quasi-balance period may be determined, and Isum may be accumulated, and if pumping is terminated, Isum accumulated in this cycle may be accumulated on Itsum and is reset as 0.

In a specific operation procedure of the computer program, if i=1 is input in the state where Isum and Itsum are input as 0, a first groundwater level difference Dh(1) is calculated by the above-defined Equation as below.

$$Dh(1) = \text{head}(2) - \text{head}(1).$$

The first groundwater level difference Dh(1) is determined as an initial stage of pumping. Since determination on two data has been completed, as illustrated in the flowchart of FIG. 1, i=2 due to the rule of i=i+1, and two continued data head(3)-head(2) are determined. In this procedure, a period between first data has been determined as the initial stage of pumping, and thus, Isum is accumulated by 1.

Subsequently, if i=2 is substituted, Dh(2)=head(3)-head(2), and a groundwater level difference between third data and second data is calculated, and it is determined whether this period is which period. In the program, it is sequentially determined whether a period between two continued data is an initial stage of pumping, whether the period between two continued data is a quasi-balance period, and whether the period between two continued data is a recovery period. Whenever this determination is performed, i is increased by 1, and only when the period between two continued data is determined as the initial stage of pumping or the quasi-balance period, Isum is obtained by adding 1 to Isum.

If determination is performed continually in the above manner and determination on all of data is completed, the pumping amount is calculated using Itsum accumulated in the entire procedure. If, in the program, i exceeds a value obtained by subtracting 1 from $N_{TIME}$ that is the number of measurement of groundwater level data, it is recognized that determination on all of data has been completed. For example, if measurement has been performed 100 times and the number of data is 100, a groundwater level difference Dh(99) between $100^{th}$ data and $99^{th}$ data is determined and thereby determination on all of data is completed. Thus, if i is 100 due to the rule of i=i+1, data determination is completed, and an arithmetic operation on the pumping amount of groundwater is performed.

First, the time between data determined as the initial stage of pumping and the quasi-balance period is calculated. In the present embodiment, since a time interval Dt between data measurement times has been maintained at a constant value, a total pumping time T is calculated by multiplying a total accumulation coefficient Itsum by Dt. By multiplying the total pumping time T by a pumping amount of the pumping pump per hour, i.e., the capacity of the pumping pump, a total pumping amount during a full pumping period may be calculated.

In the present embodiment, the measurement time between data is constant. However, the measurement time may vary according to embodiments. In such a case, the time between data determined as the initial stage of pumping and the quasi-balance period is separately calculated to calculate the total pumping time T.

As described above, in the method of measuring the pumping amount of groundwater by using water level fluctuation according to the present invention, the level of groundwater that is continually measured at predetermined time intervals by using the typical pattern of water level fluctuation when groundwater is pumped by using the pumping pump, is matched to the typical pattern, thereby measuring a pumping time and a pumping amount. This procedure is implemented by using the computer program, and only when data regarding the level of groundwater are obtained, the pumping time and the pumping amount may be calculated.

Figure 4:
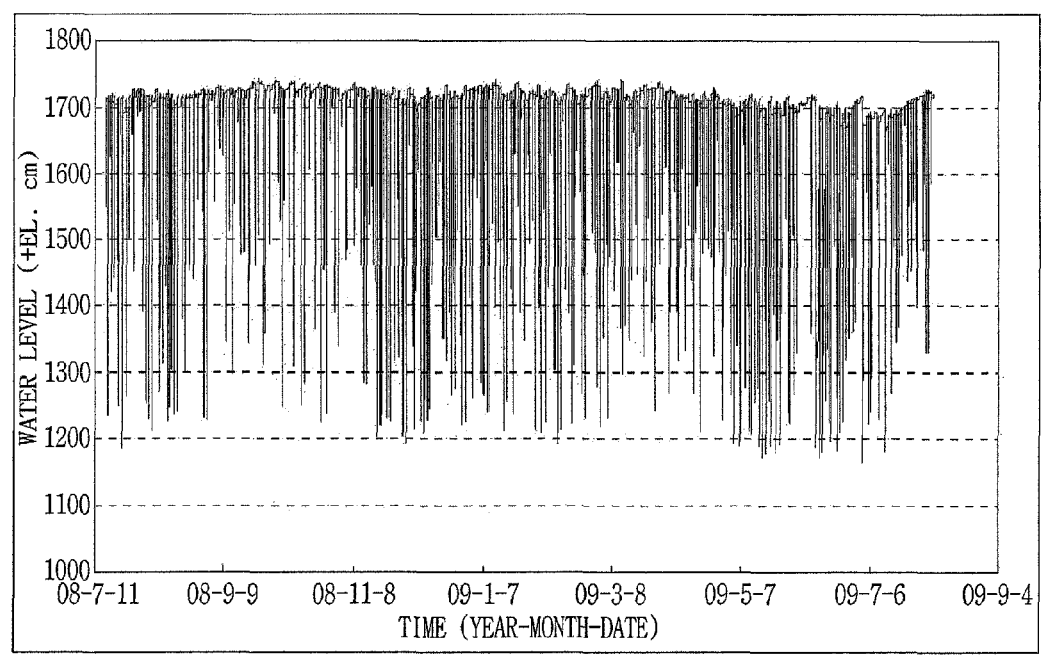
FIG. 4 is a graph showing groundwater level fluctuation measured for about one year from Jul. 11, 2008 to Aug. 4, 2009.

FIG. 4 is a graph showing fluctuation of a groundwater level that is automatically measured by an automatic water level measuring device in a groundwater observation well in Mongolia at a time interval of one hour for about one year from Jul. 11, 2008 to Aug. 4, 2009. As shown in the graph of FIG. 4, a rapid water level drop is repeated by pumping of about 3 to 6 m. Such a repeated pumping pattern may be shown in Table of FIG. 5 by indicating a point in time when pumping has been performed based on the typical pattern of water level fluctuation caused by pumping illustrated in FIG. 3. In Table of FIG. 5, a point in time when pumping has been performed is indicated by 1, and a point in time when pumping has not been performed is indicated by 0 for two days, i.e., Jul. 16 and Jul. 17, 2008. A period indicated by 1 corresponds to an initial stage of pumping or a quasi-balance period.

The result of comparing a pumping duration time calculated by determining by the naked eye based on a typical pattern graph of water level drop caused by pumping with a pumping duration time calculated by a program for executing the method according to the present invention is as shown in Table of FIG. 6 indicating data regarding verification of reliability of a program for executing the method of FIG. 1.

As seen from Table of FIG. 6, a total pumping duration time calculated by using the program for executing the method according to the present invention varies according to input values of Dmax and tol, and an error rate thereof is within 14%. In this regard, Dmax needs to be properly determined according to the performance of a submersible pump, the structure of a groundwater observation well, and the structure and characteristics of a groundwater aquifer, and tol needs to be properly determined according to the structure and characteristics of an aquifer. It is generally most preferable to determine values measured on the spot empirically and to select them.

According to the current result of comparison and analysis, when Dmax is 30 cm, an error rate is smallest, and when Dmax is 20 cm, the result of calculation of a total pumping duration time increases compared to a case where Dmax is 30 cm, whereas, when Dmax is 40 cm, the result of calculation of a total pumping duration time decreases. As a value of tol increases, a total pumping duration time also increases. An error rate between the total pumping duration time and the total pumping amount calculated by using a new algorithm by changing several values Dmax and tol and the total pumping duration time and the total pumping amount calculated by comparing the typical pattern graph of water level drop caused by pumping, is generally predicted within 15%.

The method of measuring the pumping amount of groundwater by using water level fluctuation according to the present invention is input to an arithmetic operation unit of the water level measuring sensor in a format of a program, a total pumping amount of groundwater may be calculated by the water level measuring sensor. Generally, sensors for measuring the state of groundwater are installed in an observation well for a predetermined period, measure a change of states of groundwater for the period and store the measured change in a data logger. The water level measuring sensor according to the present invention measures the level of groundwater at time intervals continually, and the program for executing the method is input to the arithmetic operation unit and thus, the pumping amount of groundwater for a predetermined period may be calculated based on measured data.

In addition, the program for executing the method of measuring the pumping amount of groundwater by using water level fluctuation according to the present invention has been recorded on a computer-readable recording medium. After the computer-readable recording medium is read by the computer, groundwater level data obtained by the water level measuring sensor are input to the program recorded on the recording medium, an operation of the program starts, and the pumping amount of groundwater may be calculated.

For example, the water level measuring sensor is installed in an observation well for pumping groundwater and stores data. Then, data are obtained from a data logger of the water level measuring sensor after an investigation period elapsed, the recording medium is read by the computer, and the operation of the program starts, and then the obtained data are input to the program so that the pumping amount may be calculated in a simple manner.

Furthermore, the water level measuring sensor transmits the measured data to the computer by using a wired or wireless network, and the data is input to the program recorded on a recording medium etc. so that the pumping amount may be calculated in a simple manner.

As described above, in a method of measuring a pumping amount of groundwater by using water level fluctuation according to the present invention, the pumping amount of groundwater for a predetermined period can be measured with reliability.

In addition, in a water level measuring sensor and a computer-readable recording medium having recorded thereon a program for executing the method according to the present invention, the program for executing the method has been recorded on the computer-readable recording medium so that the pumping amount of groundwater can be very simply measured by using the program when data regarding the level of groundwater are obtained.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A non-transitory computer-readable recording medium having instructions recorded thereon configured to perform a method of estimating an amount of groundwater pumped from a well when executed by a computer, the method comprising:
   inputting a maximum drop threshold (Dmax), a tolerance (tol), a delta time interval (Dt), and a pump capacity (Capacity$_{pump}$);
   obtaining sensor data that comprises water head level (HEAD) data points as a function of time in which the sensor data comprises a total number ($N_{time}$) of HEAD data points;
   making an array of head differences (Dh(i)) between adjacent timed HEAD data points in accordance to Dh(i) =HEAD(i+1)−HEAD(i), wherein i is a counting integer between and including 1 and $N_{time}$−1;
   setting initially an integer sum to zero ($i_{SUM}$=0), an integer total sum to zero ($it_{SUM}$=0), the counting integer to one (i=1), the amount of groundwater pumped from the well to zero ($Q_{tot}$=0); and a total pumping time to zero ($T_{pump}$=0);
   increasing $i_{SUM}$=$i_{SUM}$+1, when Dh(i)<0 and when Abs|Dh(i)|>Dmax;
   advancing i=i+1 after increasing $i_{SUM}$=$i_{SUM}$+1;
   incrementing $i_{SUM}$=$i_{SUM}$+1,
      when Abs|Dh(i)|≤Dmax, $i_{SUM}$≠0 and Dh(i)≤0, or
      when Abs|Dh(i)|≤Dmax, $i_{SUM}$≠0 and Abs|Dh(i)|≤tol;
   stepping i=i+1 after incrementing $i_{SUM}$=$i_{SUM}$+1;
   summing $it_{SUM}$=$it_{SUM}$+$i_{SUM}$,
      when $i_{SUM}$≠0 and Dh(i)>tol;
   resetting $i_{SUM}$=0 after summing $it_{SUM}$;
   adjusting $Q_{tot}$=$Q_{tot}$+(Capacity$_{pump}$×$it_{SUM}$) after summing $it_{SUM}$;
   accumulating i=i+1 after resetting $i_{SUM}$ and after summing $it_{SUM}$;
   repeating the steps of increasing, advancing, incrementing, stepping, summing, resetting, adjusting, and accumulating until i+1>$N_{time}$;
   calculating $T_{pump}$=$It_{SUM}$×Dt when i>($N_{time}$−1); and
   outputting $T_{pump}$ and $Q_{tot}$ when i>($N_{time}$−1).

2. The non-transitory computer-readable recording medium of claim 1, wherein time intervals for measurement of groundwater levels in the sensor data are determined by a user.

3. The non-transitory computer-readable recording medium of claim 1, wherein time intervals for measurement of groundwater levels in the sensor data are predetermined.

4. The non-transitory computer-readable recording medium of claim 1, wherein time intervals for measurement of groundwater levels in the sensor data are sequential.

5. The non-transitory computer-readable recording medium of claim 1, wherein obtaining the sensor data is obtained by transmitting the sensor data in real time.

6. The non-transitory computer-readable recording medium of claim 1, wherein maximum drop threshold (Dmax) is a predetermined value.

7. The non-transitory computer-readable recording medium of claim 1, wherein maximum drop threshold (Dmax) is determined at an initial stage of pumping.

8. The non-transitory computer-readable recording medium of claim 1, wherein maximum drop threshold (Dmax) is empirically determined.

9. The non-transitory computer-readable recording medium of claim 1, wherein environmental factors which influence the maximum drop threshold (Dmax) are selected from the group consisting of soil conditions, measurement time intervals, and the pump capacity (Capacity$_{pump}$).

10. The non-transitory computer-readable recording medium of claim 1, wherein the tolerance (tol) is a predetermined value.

11. The non-transitory computer-readable recording medium of claim 1, wherein environmental factors which influence the tolerance (tol) are selected from the group consisting of soil conditions, measurement time intervals, and the pump capacity (Capacity$_{pump}$).

12. The non-transitory computer-readable recording medium of claim 1, wherein the integer sum ($i_{SUM}$) corresponds to a sub total sum of groundwater pumped within a given period of time.

13. The non-transitory computer-readable recording medium of claim 1, wherein the integer total sum ($it_{SUM}$) corresponds to a total sum of groundwater pumped during an entire measurement of the sensor data.

14. The non-transitory computer-readable recording medium of claim 1, wherein the total sum of groundwater pumped ($Q_{tot}$) corresponds to a total amount of groundwater pumped for during an entire measurement time of the sensor data.

15. A system for estimating an amount of groundwater pumped from a well, the system comprising:
   a water level measuring sensor configured to transmit sensor data associated with water levels as a function of time;
   a computer in communications with the water level measuring sensor, the computer comprising a non-transitory computer-readable medium having instructions recorded thereon configured to perform a method of estimating the amount of groundwater pumped from a well when executed by the computer, the method comprising:

inputting a maximum drop threshold (Dmax), a tolerance (tol), a delta time interval (Dt), and a pump capacity (Capacity$_{pump}$);

obtaining sensor data that comprises water head level (HEAD) data points as a function of time in which the sensor data comprises a total number (N$_{time}$) of HEAD data points;

making an array of head differences (Dh(i)) between adjacent timed HEAD data points in accordance to Dh(i)=HEAD(i+1)−HEAD(i), wherein i is a counting integer between and including 1 and N$_{time}$−1;

setting initially an integer sum to zero (i$_{SUM}$=0), an integer total sum to zero (it$_{SUM}$=0), the counting integer to one (i=1), the amount of groundwater pumped from the well to zero (Q$_{tot}$=0); and a total pumping time to zero (T$_{pump}$=0);

increasing i$_{SUM}$=i$_{SUM}$+1, when Dh(i)<0 and when Abs|Dh(i)|>Dmax;

advancing i=i+1 after increasing i$_{SUM}$=i$_{SUM}$+1;

incrementing i$_{SUM}$=i$_{SUM}$+1,
when Abs|Dh(i)|≤Dmax, i$_{SUM}$≠0 and Dh(i)≤0, or
when Abs|Dh(i)|≤Dmax, i$_{SUM}$≠0 and Abs|Dh(i)|≤tol;

stepping i=i+1 after incrementing i$_{SUM}$=i$_{SUM}$+1;

summing it$_{SUM}$=it$_{SUM}$+i$_{SUM}$,
when i$_{SUM}$≠0 and Dh(i)>tol;

resetting i$_{SUM}$=0 after summing it$_{SUM}$;

adjusting Q$_{tot}$=Q$_{tot}$+(Capacity$_{pump}$×it$_{SUM}$) after summing it$_{sum}$;

accumulating i=i+1 after resetting i$_{SUM}$ and after summing it$_{SUM}$;

repeating the steps of increasing, advancing, incrementing, stepping, summing, resetting, adjusting, and accumulating until i+1>N$_{time}$;

calculating T$_{pump}$=It$_{SUM}$×Dt when i>(N$_{time}$−1); and outputting T$_{pump}$ and Q$_{tot}$ when i>(N$_{time}$−1).

16. A method for estimating an amount of groundwater pumped from a well, the method comprising:

drilling into a ground with a boring machine to a depth of an aquifer to form an observation well;

submerging a pump into the aquifer within the observation well;

measuring water level in the aquifer with a sensor;

soaking the sensor in the aquifer within the observation well;

transmitting sensor data associated with water levels as a function of time from the sensor;

inputting a maximum drop threshold (Dmax), a tolerance (tol), a delta time interval (Dt), and a pump capacity (Capacity$_{pump}$);

obtaining the sensor data that comprises water head level (HEAD) data points as a function of time in which the sensor data comprises a total number (N$_{time}$) of HEAD data points;

making an array of head differences (Dh(i)) between adjacent timed HEAD data points in accordance to Dh(i)=HEAD(i+1)−HEAD(i), wherein i is a counting integer between and including 1 and N$_{time}$−1;

setting initially an integer sum to zero (i$_{SUM}$=0), an integer total sum to zero (it$_{SUM}$=0), the counting integer to one (i=1), the amount of groundwater pumped from the well to zero (Q$_{tot}$=0); and a total pumping time to zero (T$_{pump}$=0);

increasing i$_{SUM}$=i$_{SUM}$+1, when Dh(i)<0 and when Abs|Dh(i)|>Dmax;

advancing i=i+1 after increasing i$_{SUM}$=i$_{SUM}$+1;

incrementing i$_{SUM}$=i$_{SUM}$+1,
when Abs|Dh(i)|≤Dmax, i$_{SUM}$≠0 and Dh(i)≤0, or
when Abs|Dh(i)|≤Dmax, i$_{SUM}$≠0 and Abs|Dh(i)|≤tol;

stepping i=i+1 after incrementing i$_{SUM}$=i$_{SUM}$+1;

summing it$_{SUM}$=it$_{SUM}$+i$_{SUM}$,
when i$_{SUM}$≠0 and Dh(i)>tol;

resetting i$_{SUM}$=0 after summing it$_{SUM}$;

adjusting Q$_{tot}$=Q$_{tot}$+(Capacity$_{pump}$×it$_{SUM}$) after summing it$_{SUM}$;

accumulating i=i+1 after resetting i$_{SUM}$ and after summing it$_{SUM}$;

repeating the steps of increasing, advancing, incrementing, stepping, summing, resetting, adjusting, and accumulating until i+1>N$_{time}$;

calculating T$_{pump}$=It$_{SUM}$×Dt when i>(N$_{time}$−1); and outputting T$_{pump}$ and Q$_{tot}$ when i>(N$_{time}$−1).

* * * * *